US007656242B2

(12) United States Patent
Boyd

(10) Patent No.: US 7,656,242 B2
(45) Date of Patent: Feb. 2, 2010

(54) ELECTROMAGNETIC ELECTRIC GENERATOR

(75) Inventor: Joseph J. Boyd, 361 17th St., NW., Unit 902, Atlanta, GA (US) 30363-1081

(73) Assignee: Joseph J. Boyd, Atlanta, GA (US)

( * ) Notice: Subject to any disclaimer, the term of this patent is extended or adjusted under 35 U.S.C. 154(b) by 655 days.

(21) Appl. No.: 11/557,452

(22) Filed: Nov. 7, 2006

(65) Prior Publication Data

US 2008/0129397 A1    Jun. 5, 2008

(51) Int. Cl.
*H03B 5/18* (2006.01)

(52) U.S. Cl. .................................................. 331/96

(58) Field of Classification Search ................... 331/74, 331/96

See application file for complete search history.

(56) References Cited

U.S. PATENT DOCUMENTS 4,931,735 A * 6/1990 Overweg et al. ............ 324/318

* cited by examiner

*Primary Examiner*—David Mis
(74) *Attorney, Agent, or Firm*—Ryan A. Schneider; Troutman Sanders LLP

(57) ABSTRACT

An electrical generator that uses a high frequency oscillator in a tuned circuit, set to resonate with the transmitter coil of a full-length high frequency transformer unit, to generate electromagnetic energy, to transform this energy to electrical energy and to collect this energy.

9 Claims, 3 Drawing Sheets

ELECTROMAGNETIC ELECTRIC GENERATOR

BACKGROUND OF THE INVENTION

1. Field of the Invention

The present invention is an electrical generator that uses a high frequency oscillator in a tuned circuit, set to resonate with the transmitter coil of a full-length high frequency transformer unit, to generate electromagnetic energy, to transform this energy to electrical energy and to collect this energy.

2. Description of the Related Art

If an oscillator circuit is properly connected to a tuned antenna so that it resonates, a current will flow between the aerial and the ground, and this produces the high frequency electromagnetic air waves and ground waves of our radios and other electronic equipment.

An oscillator of the same type used in electromagnetic wave transmission equipment is used to generate the electromagnetic energy used in this patent. These electromagnetic transmitters are well developed and are used world wide, and broadcast at frequencies that extend from the longest radio waves to the very short ones. Certain radios send their signals great distances, some even traveling around the world.

Although these high frequency electromagnetic energy waves are all around us, this energy has long been considered impossible to collect on a large scale due to the induction characteristics of the electromagnetic wave as it passes a metallic object. As the wave goes by a wire tuned to resonate at the frequency of the wave, it induces an electrical charge in the wire, but to use this charge, we need another wire to close the circuit and let the charge flow. If we use another wire alongside the first wire and connected to it, the wave induces a charge in it exactly like in the first wire and no current will circulate in the two wires.

This problem of collecting the energy of the wave was solved by the invention of the half-length electromagnetic transformer, but the half-length electromagnetic transformer applies only to the means of collecting the atmospheric energy. The invention of the full-length electromagnetic transformer of this invention, however, allows us to combine the generation of the electromagnetic wave and the electrical converter into one compact unit.

BRIEF SUMMARY OF THE INVENTION

Basically, this unit uses an oscillating electric current to generate an electromagnetic wave, which releases a much greater electric current, and the total electrical energy derived in this manner, is over and above the amount of energy needed to operate the equipment.

It has long been assumed that the only energy involved in high frequency electromagnetic transmission is that supplied by the operator to drive his equipment. The actual energy of the electromagnetic wave is often over a hundred times greater than this since the amount of electromagnetic energy in the earth is practically unlimited, there appears to be no limit to the size of the electromagnetic generators, or to the size of the power plants based on this energy source. This energy is available, world wide, free for the taking.

This energy is related to the light waves and is probably a variation of the light waves, however, the radio type waves are longer than light waves and are vibrating at a lower frequency. Light waves are a source of high energy just for the taking, also. Anything that is brought up to a high heat, will give off light energy. A very small wire in a light bulb, when brought to a high heat will release a light ray of such power that it will go all the way to the moon. This is natural energy, produced by the speed of the earth through space. Using the math of Dynetics, the speed of the earth necessary to give any pound of earth the atomic energy of one pound of uranium, came out exactly the same as the speed of light (186,300 miles per second). The fact that the math came out exactly at this speed leaves little doubt that the speed of the earth through space is the speed of light, and that every pound of material on earth has the energy of one pound of uranium, due to this speed.

The electromagnetic energy in the low frequency range differs from other types of energy, in many ways, but of interest to us is that it is propagated by electrical currents, travels through the air like the light waves, and is detected and may be collected, when it induces an electric charge in a wire.

This is an ideal source of energy. The generators may be hand-held or large enough to replace the biggest power plants. They may be used to drive motor cycles, sleds, autos, trucks, trains, ships and planes. The fact that the output is in the form of electrical energy is, in itself, a great benefit, but the fact that the generating equipment is light and compact is a real plus for all types of mobile equipment.

It is possible that this invention will supply all of the electrical energy needed in the homes making the distribution lines unnecessary, and if used to drive automobiles, our dependence on oil will be a thing of the past.

This invention makes possible an abundance of energy, available to mankind any where in the world. Even the poorest nations will have an abundance of energy.

The oscillating equipment that generates the electromagnetic wave used in this invention includes an oscillator, of some type driving a tuned transmitter coil that resonates with a tuned collector coil in a full-length electromagnetic transformer. The induced current is collected in the collector coil and may be rectified and stored in a battery or used to do work. The oscillator circuit is an ordinary oscillator circuit, driven by a tube, crystal or even an electoral arc, and the tuning means and rectification set-up are standard.

The basic element that is novel to this invention is the full-length electromagnetic transformer unit that is made up of two or more metallic pipe like sheaths side by side. The sheaths are not connected together, electrically. Two or more coils are wound in the sheaths.

The transmitter coil uses an insolated wire, which is threaded up through one sheath, and down through another sheath a number of times forming a long flat continuous circuit of wire inside of the pipe like sheaths. And then the collector coil is threaded up through the sheaths, and wound the same way. The two coils may have a different number of turns. The coils are tuned to resonate at the oscillator frequency and an electromagnetic wave is generated in the transmission coil. The wave induces a charge in that part of the collector coil that is in the same sheath, and next to it, and if the wave is moving up in the sheath, the charges of all of the collector wires in that sheath are moving up, and if the wave is moving down, the charges of all of the collector wires are moving down. But the transmitter wave in one sheath does not induce a current in the wires of another sheath, nor does it induce a current in a wire outside of that sheath. This allows a current induced in one sheath to freely circulate in the other sheaths or on an outside wire.

When the transmitter coil is brought up to resonance and broadcasts its electromagnetic wave inside of the sheaths, it benefits us in two ways. It keeps the wave inside of the sheaths and prevents it from spreading far and wide, and it concentrates the wave on that part of the collector coil in the same sheath.

Since each of the collector wires are of the same length, say ½ wave length of the electromagnetic wave, and since they are parallel and side by side, a resonant electromagnetic wave induces equal charges in all of the collector wires within the sheath. These induced currents are exactly in phase and are connected in series, so that the voltages add up to an amount proportional to the number of turns.

More than two sheaths may be used with the coils wound inside, or the ff11 length-transformer may be combined with the half-length transformer where the winding is part inside the sheath and part outside of the sheaths. The oscillator may be replaced by an aerial in cases where low power is needed. The inductance coil may be left entirely outside of the transformer, and the coupling made to the transmission coil by magnetic induction.

These and other objects, features and advantages of the present invention will become more apparent upon reading the following specification in conjunction with the accompanying drawing figure.

DETAILED DESCRIPTION OF THE PREFERRED EMBODIMENTS

When a circuit is made to resonate at some frequency, it generates an electromagnetic wave. These waves move at the speed of light and travel great distances, and this makes possible our radios, televisions and cell phones. These waves, in passing a wire suspended in the air, set up alternating charges in the wire, varying at the frequency of the wave. If we put an inductance, that is tuned to the frequency of the wave, between the wire and the ground the circuit will resonate and charges will flow back and forth on the wire. This allows us to pick out the wave we are interested in, amplify it and read its message. We have long known that the voltage of the wave we choose to receive is greatly amplified when we make our circuit resonate at that wave's frequency, but we have been unable to accumulate this additional energy from the wave because we are limited to what energy we can pick up by the equipment that we use.

Figure 1:
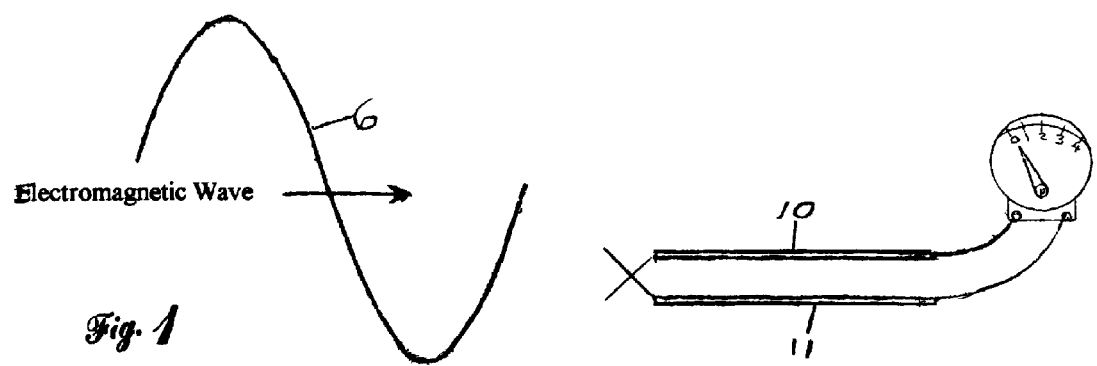
FIG. 1 is a view of an electromagnetic wave, due to resonance, passing two side by side wires tuned to the same frequency. The wave generates equal alternating charges in each wire, and no current flows when the wires are connected.

FIG. 1 shows why this is so. The passing electromagnetic wave 6 generates an alternating electric charge in the wire 10, tuned to the wave frequency To close the circuit so that the induced charge can circulate, we have added a second wire 11, but if we connect the ends of the wires together, the electromagnetic wave 6 induces a charge in the second wire exactly like the one in the first wire, and no current will flow. Any effort to circulate the charge induced in wire 10 is blocked by an equal opposing charge in 11.

Figure 2:
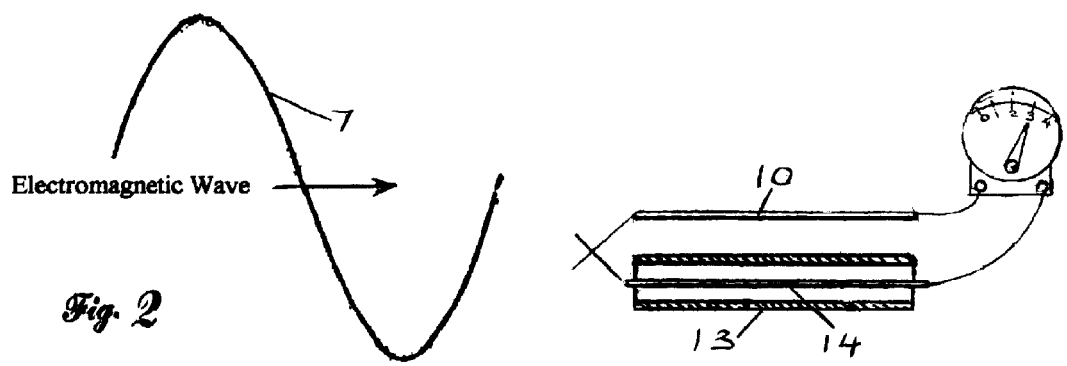
FIG. 2 is a view of a resonating electromagnetic wave passing two wires, tuned to resonate, where one wire is surrounded by a metal sheath. The outer metal sheath stops the wave and prevents it from inducing a charge in the shielded wire. The Charge induced in the outside wire now flows freely through the shielded wire.

In FIG. 2 we have replaced the wire 11 with a metallic, pipe like sheath 13 having an insolated wire 14 inside when an electromagnetic wave 7 passes, the wave is stopped at the sheath 14 and does not induce any charges in the inner wire 14. This allows the inside wire 14 to conduct the charge induced in the wire 12.

Figure 3:
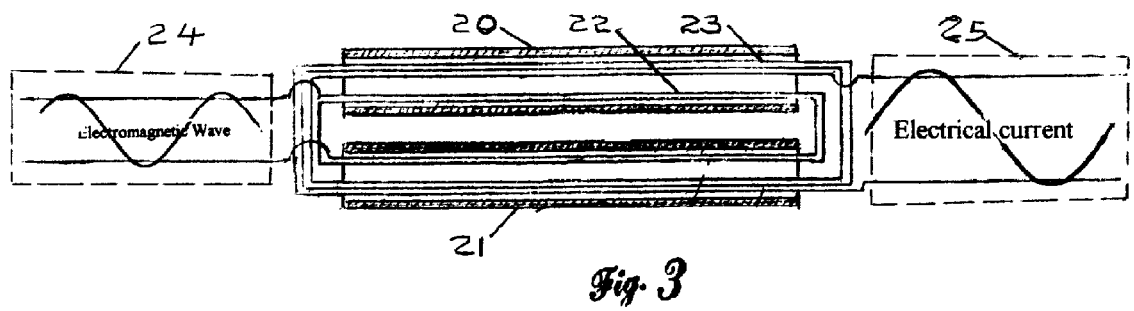
FIG. 3 is a view of a full length electromagnetic transformer made of two metallic pipe like sheaths, having two wires threaded up through the inner opening of one sheath and down through the inner opening of the other sheath, a number of times to form two continuous coils. When an electromagnetic wave is fed into the tuned transmitter coil, an alternating current is induced in the tuned collector coil.

In FIG. 3 we see two sheaths 20 and 21, parallel and insolated from each other. Two separate coils 22 and 23 are wound inside the sheaths. The coil 22 is the transmitter coil and it is tuned to resonate at the frequency of the oscillator circuit 24, and this generates an electromagnetic wave that induces a current in the collector coil 23, which is adapted and used in the tuned collector circuit 25.

Figure 4:
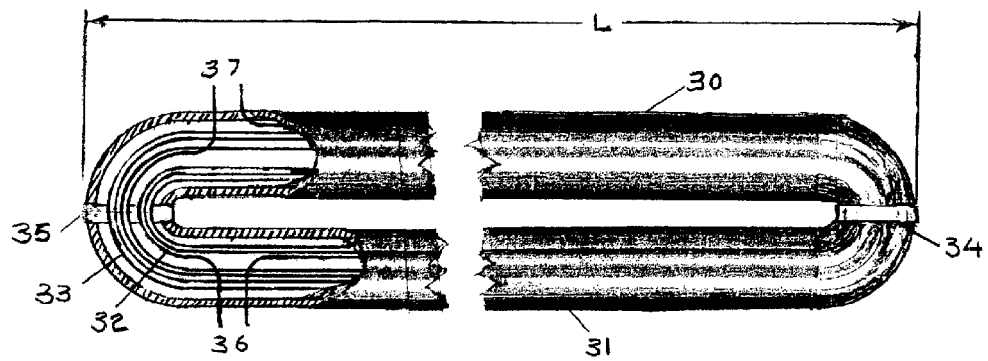
FIG. 4 is a view of a full-length electromagnetic transformer, having two sheaths, insolated from each other, and a cutaway portion shows the coils inside.

FIG. 4 is a view of a full-length electromagnetic electric generator using two separate sheaths 30 and 31, where the electromagnetic wave is almost completely contained within the sheaths. The sheaths are parallel and insolated from each other by insulators 34 and 35. The transmitter coil 32 and the collector coil 33 are shown in the cut-away, and are wound completely inside the sheaths. Additional coils may be added as needed. The transmitter coil 32 is tuned to resonate at the frequency of the oscillator circuit, which connects in at 36. And this generates an electromagnetic wave that is contained within the sheaths and induces a current in the collector coil 33, which is tuned to resonate at the wave frequency and is coupled to the collector circuit at the terminal 37. The insolated separators 34 and 35 are necessary to prevent the induced current from flowing in the sheaths 30 and 31.

Figure 5:
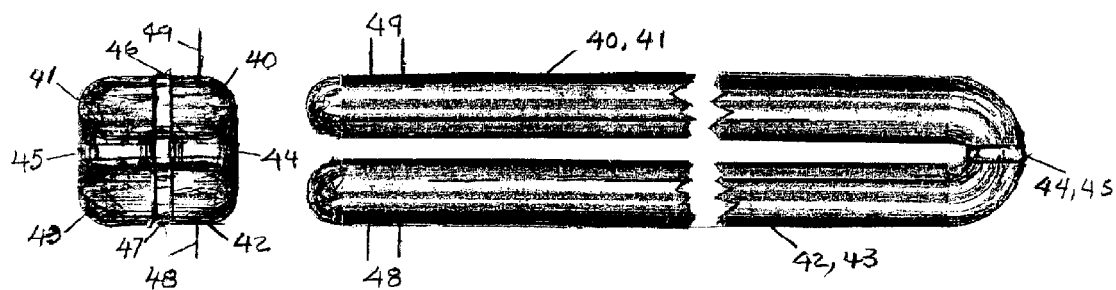
FIG. 5 is a view of a full-length electromagnetic transformer, having four sections insolated from each other.

A number of sheaths may be combined, as is shown in FIG. 5. In this case four sheaths 40, 41, 42 and 43 are combined, so that the coils wound inside of the sheaths are in series, and the sheaths are electrically separated by the insulators 44, 45, 46 and 47. The tuned circuit for the transmitter coil is hooked up at connectors 48, and the collector circuit connects to the collector coil at 49.

Figure 6:
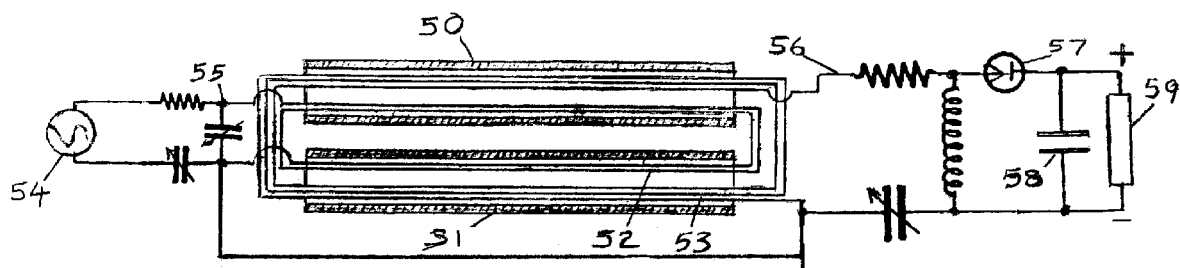
FIG. 6 is a section view of a full length electromagnetic transformer made of two metallic pipe like sheaths, where an oscillator circuit is fastened to a tuned transmitter coil, which induces a current in the tuned collector coil; and a half-wave rectifier circuit converts the high frequency current to DC current.

A simple circuit for operating the full-length electromagnetic transformer is shown in FIG. 6. The two sheaths 50 and 51 are shown with the transmitter coil 52 and collector coil 53. The transmitter coil is connected to the tuned circuit 55, which is driven by the oscillator 54. The oscillator 54 is tuned to oscillate at some frequency and the transformer circuit 55 and collector circuit 56 are tuned to resonate with it. At resonance the transmitter coil 52 emits an electromagnetic wave which induces a current in the collector coil 53. Shown here is a half-wave rectifier 57 and capacitor 58 connected to the load 59.

The rectifier is necessary on each collector unit, because we can add the direct currents of the separate units, but the alternating currents of the units might be out of phase and without the rectifier they would cancel out.

Figure 7:
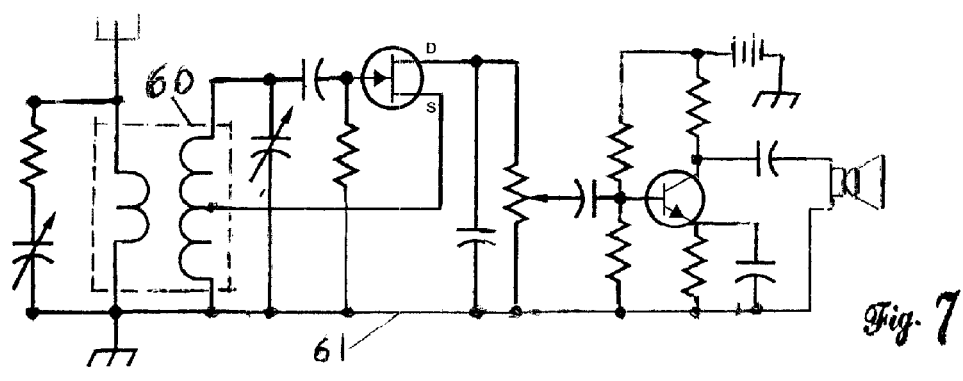
FIG. 7 shows a view of a full-length transformer, used as an inductance in a radio receiver or other similar electronic circuit 61. In this case the transmitter coil is between the aerial and ground, and the collector coil acts as the radio frequency inductance.

FIG. 7 is shown the transmitter coil connected between an aerial and the ground, where the aerial circuit and collector circuit are tuned to resonate at a desired frequency to greatly boost the sensitivity and to amplify the signal. This type application will work equally well with transmitters.

Also, using the half-length transformer as an aerial and the full-length transformer as the radio frequency transformer works the same with both receivers and transmitters. The oscillator circuit can use a high frequency magnetic inductance and the full-length transformer unit to resonate with a half-length transformer which acts as an aerial. A unit such as this would greatly add to the power of a radar system.

Figure 8:
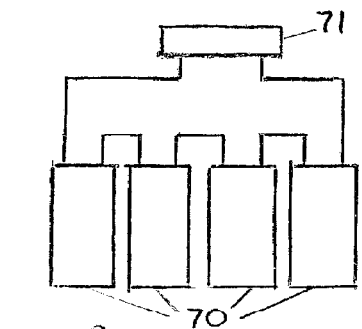
FIG. 8 shows a number of full-length transformers, connected in series. They all have rectifiers to convert the high frequency AC current to DC current and the voltages at the load add up.
Figure 9:
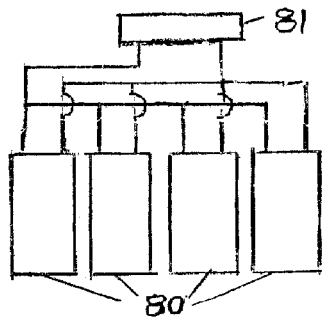
FIG. 9 shows a view of a full-length transformer, connected in parallel. In this case the currents at the load add up.

The full-length units, when combined with rectifiers, may be connected in series as in FIG. 8, or in parallel as in FIG. 9

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. An electric generator that uses an oscillating circuit to resonate with inductances enclosed in a full-length electromagnetic transformer unit, comprising:

two or more parallel, metallic, pipe-like sheaths, insolated from each other;

an electromagnetic transmitter coil, which is wound inside the sheaths, using an insolated wire, threaded up through the inside opening of one of the sheaths and down on the inside of a second sheath, one or more times, to form a continuous coil;

a means of tuning the transmitter coil to the frequency of the oscillating circuit, so that the transmitter coil resonates and generates an electromagnetic wave that is contained within the sheaths;

a collector coil composed of an insolated wire, threaded up through the inside opening of one of the sheaths and down on the inside of a second sheath, one or more times, to form a continuous coil, wherein the electromagnetic wave of the transmitter coil induces an electric charge in the collector coil; and a means of tuning the collector coil to resonate at the frequency of the oscillating circuit;

so that the electromagnetic wave induces a current in the collector coil, and since the coil is contained within the sheaths, the current is free to flow, and the high frequency alternating current, so generated, can be used elsewhere in an electronic circuit, or altered and used as a power source.

2. The full-length electromagnetic transformer unit of claim 1, where the collected current is rectified, and the DC current is stored in capacitors and used to do work.

3. The full-length electromagnetic transformer unit of claim 1, where the transmitter coil acts as a tuned inductance, in a receiver, between the aerial and the ground, and a tuned collector coil resonates to increase the sensitivity and the amplitude of the signal.

4. The full-length electromagnetic transformer unit of claim 1, where the tuned transmitter coil resonates with an oscillator and an aerial to act as a transmitter for radios, televisions, cell phones, radars and computers.

5. The full-length electromagnetic transformer unit of claim 1, where the lengths of the sheaths are some multiple of the wave length of a particular electromagnetic frequency.

6. The full-length electromagnetic transformer unit of claim 5, where a number of the units are connected in parallel to increase the current.

7. The full-length electromagnetic transformer unit of claim 5, where a number of the units are connected in series to increase the voltage.

8. The full-length electromagnetic transformer unit of claim 5, where the parts are reduced to a size small enough to fit in, and supply power to, a cell phone, a lap-top computer, or other electrical appliance.

9. The full-length electromagnetic transformer unit of claim 1 further comprising three or more, metallic, parallel, side by side, pipe like sheaths, where the sheaths are not electrically connected, and have two or more coils wound inside the sheaths.

\* \* \* \* \*